Feb. 10, 1959 E. W. EASTER 2,872,943
SPRING BALANCED FLUID PRESSURE CONTROL VALVE
Filed June 2, 1954 2 Sheets-Sheet 1

INVENTOR.
Elmer W. Easter,
BY
Christy, Parmelee & Strickland.

Feb. 10, 1959 E. W. EASTER 2,872,943
SPRING BALANCED FLUID PRESSURE CONTROL VALVE
Filed June 2, 1954 2 Sheets-Sheet 2

INVENTOR.
Elmer W. Easter
BY
Christy, Parmelee & Strickland

2,872,943
SPRING BALANCED FLUID PRESSURE CONTROL VALVE

Elmer W. Easter, Pittsburgh, Pa., assignor to Dravo Corporation, Pittsburgh, Pa., a corporation of Pennsylvania Application June 2, 1954, Serial No. 433,860

6 Claims. (Cl. 137—622)

This invention pertains in general to quick acting valves for controlling fluid pressure actuated mechanisms and more specifically to valves of this type having a pre-loaded balanced spring control mechanism which, when initially unbalanced, utilizes fluid pressure passing through the valve to accelerate the opening and closing movements of the valve.

The specific embodiment of the invention, as hereinafter referred to, is applied to operation of the steering mechanism for large vessels. The same valve may also be used for controlling the application of fluid pressure to operation of a great variety of different devices.

The valve is particularly useful where a fluid pressure actuated mechanism is substituted for a previously manually operated mechanism and it is desirable to retain the preciseness of control of the mechanism possible only with manual operation. In fact the novel construction of valve herein disclosed has all the advantages of manual control plus the exceptionally rapid application of full fluid pressure, release or reversal of that pressure.

One object of the invention is to provide a manually actuated fluid pressure control valve wherein a slight manual effort releases fluid pressure to operate the valve.

Another object of the invention is to provide a valve of the character described with a balanced mechanical force which, when unbalanced, mechanically assists the fluid pressure actuation of the valve to take up the normal time interval necessary to build up fluid pressure for actuation of the valve.

A further object of the invention is to provide a valve of the character described with pressure bleed ports which prevent accidental operation of the valve by reason of accumulation of pressure leakage interfering with the mechanical balance hereinbefore referred to.

In the drawings forming part of this disclosure:

Figure 1:
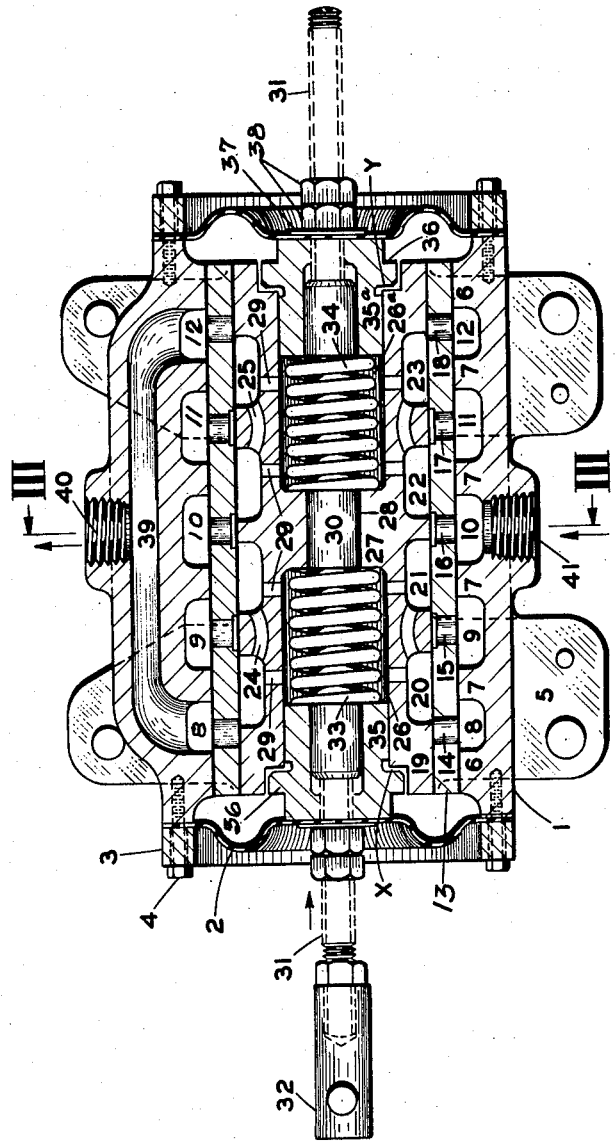
Fig. 1 shows a sectional plan view of the valve.

Referring now in detail to the drawings, reference character 1 indicates the valve housing which is closed at opposite ends by flexible diaphragms 2 held in place by ring members 3 secured to the housing by cap screws 4. Lugs 5, integral with the base of the housings serve to secure the valve to a suitable support. The valve housing 1 is hollow and provided with internal annular end ribs 6 and intermediate ribs 7 defining chambers 8, 9, 10, 11 and 12. Mounted within the housing in engagement with ribs 6 and 7 is an annular sleeve member 13 having ports 14, 15, 16, 17, and 18 registering respectively with the housing chambers 8, 9, 10, 11 and 12. Within the sleeve member 13 is a sliding valve member 19 having spaced annular passageways 20, 21, 22, and 23 for selectively registering with the ports in sleeve member 13. Passageways 20 and 21 are connected by an exhaust passage 24 and passageways 22 and 23 are connected by an exhaust passage 25. Extending inwardly from each end of valve member 19 are spring chambers 26 and 26a which are equally spaced about the center of the member by an annular rib 27. A central opening 28 in rib 27 connects the spring chambers 26. A plurality of ports 29 in the valve member 19 communicate with each spring chamber 26.

Disposed within the sliding valve member 19 and extending beyond each end of the valve casing is a valve operating member comprising a central portion 30, threaded end portions 31 and an extension member 32 mounted on one end portion 31. Within each spring chamber and mounted on the central portion 30 of the operating member are coil springs 33 and 34. These springs are selected so as to compress an equal amount upon application of the same force. Mounted on each end of the portion 30 and tapped for engagement with adjacent threaded end portion 31 are the members 35 and 35a. An annular flange 36 on each member 35 is disposed within a recess in the adjacent end of the valve member 19. The members 35 are rotated upon the end portions 31 of the operating rod until springs 33 and 34 are pre-loaded to an equal pre-selected amount between the members 35 and rib 27 of the sliding valve member 19. A washer 37 is then mounted on each end member 31 exteriorly of the flexible diaphragm 2 and lock nuts 38 tightened against the washer 37, diaphragm 2 and adjacent end of the member 35 to retain the springs in initially compressed position. As clearly shown in Fig. 1 of the drawings, spaces X and Y are provided between the adjacent portions of annular flange 36 of each member 35 and the adjacent recess in valve member 19 providing for initial movement of the members 35, from normal position, independently of movement of valve member 19.

At one side of valve housing 1 is an exhaust passageway 39 communicating with the valve passageways 8 and 12. An outlet 40 extends through housing 1 connecting passageway 39 with the atmosphere or any suitable exhaust connection. An inlet 41 in the valve housing 1 connects valve passageway 10 with a fluid pressure supply conduit. Outlet 42 and 43 in the valve housing connects valve passageway 9 and 11 respectively to suitable conduits leading to the fluid pressure actuated mechanisms to be controlled by the valve.

Referring now to operation of the valve, fluid pressure is always flowing to the valve through inlet 41 and annular passageway 10 into the ports 16 when the valve is in closed position as illustrated in Fig. 1 of the drawings. The opposing pre-loaded springs 33 and 34 keep the sliding valve member 19 centered within the housing and a portion of the fluid pressure from inlet 41 is constantly flowing through ports 16 into operating passageways 21 and 22, through channels 24 and 25 into exhaust passageways 20 and 23, to ports 14 and 18 and passageways 8 and 12 into exhaust passageway 39 and out of the valve through exhaust outlet 40. This constant flow of fluid pressure also passes freely from passageways 20, 21, 22 and 23 through ports 29 into the spring chambers 26 providing equal opposing fluid pressures therein. Any leakage of pressure about the sliding valve member 19 will pass into the pockets formed by the diaphragm 2 at each end of the valve housing.

Assuming it is desired to admit fluid pressure to outlet 42 for actuating a mechanism connected therewith, the end portion 32 of operating member 30 is actuated by any suitable means to move member 30 to the right, of its position as shown in Fig. 1 of the drawings, a distance closing spacing X between flange 36 of member 35 and sliding valve member 19. Any such movement in the member 30 carries with it member 35 and 35a further compressing spring 33 and reducing the pressure on spring 34, causing an imbalance between the pressures on the springs 33 and 34 acting on rib 27 of sliding valve member 19. Such imbalance immediately moves valve member 19 to the right as the springs seek to reestablish a balanced condition. Such movement in member 19 reduces the opening in exhaust port 14 and increases the amount of fluid pressure admitted to passageway 21 and spring chamber 26. The build up of pressure in spring chamber 26 moves valve member 19 to the right until it engages flange 36 on member 35a fully closing exhaust port 14 and establishing full flow of pressure from inlet 10 through chambers 20 and 21 to outlet 42 and the mechanism to be actuated.

Figure 2:
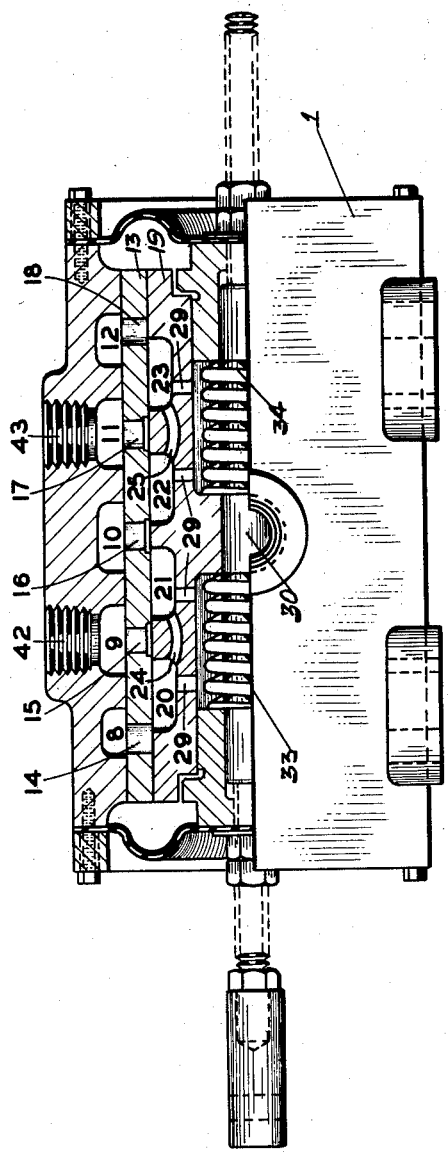
Fig. 2 shows a side elevation of the valve partly in section.
Figure 3:
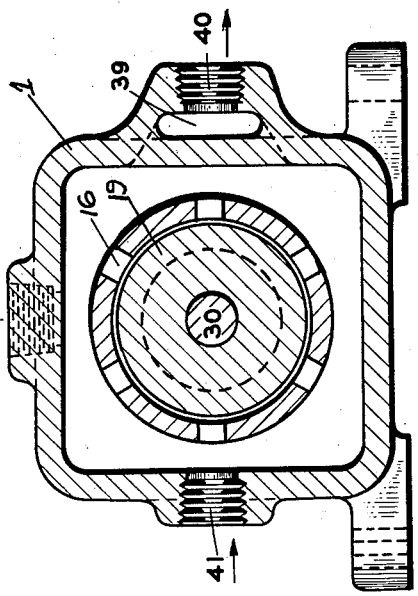
Fig. 3 shows a full section through the valve as indicated by the lines III—III of Fig. 1.

Referring again to Figs. 1 and 2, spacing X and Y between the ends of valve member 19 and flanges 36 of the members 35 and 35a are equal and maintained so, when the valve is closed, by the opposing balanced springs 33 and 34. Hence any initial movement in operating member 32 to close either spacing X or Y, is against only the pressure of the springs 33 and 34 but provides for a movement in valve member 19, which is twice the distance of X or Y, under fluid pressure within the spring chamber 26 or 26a. Likewise member 35 and 35a selectively limit movement of valve member 19.

When it is desired to close the valve, operating member 30 is moved to the left a short distance carrying with it the members 35a and 19. This movement compresses spring 34 and is assisted by fluid pressure within spring chamber 26. Such movement also opens exhaust port 14 which bleeds pressure from spring chamber 26 so that springs 33 and 34 in re-establishing their normal balanced relation return sliding valve member to the position shown in Figs. 1 and 2.

Should it be desired to admit fluid pressure to outlet 43 for actuating the mechanism associated therewith, the valve operating member 30 is moved to the left from the neutral position shown in Fig. 1 causing the reverse action of the valve to that previously described for movement of the valve to the right.

The exact details of construction of the valve as described and shown herein are for purposes of illustration and not limitation, except as made necessary by the scope of the appended claims.

What is claimed is:

1. In a valve of the character described in combination, a valve housing, a valve member slidably mounted within the housing for axial movement relative thereto in controlling passage of fluid pressure through the housing and valve member, internal spaced compartments within the valve member receiving fluid pressure to actuate the valve, a compression spring mounted in each valve compartment, an operating member extending through the housing, the valve member and the springs for movement relative thereto, means secured adjacent each end of the operating member and extending within the spring compartment compressing the adjacent spring and disposed in spaced overlapping relation to the adjacent end of the valve member permitting limited movement of the means relative to the valve member, selective movement of said operating member causing imbalance between said springs resulting in movement of the sliding valve member to re-establish a balanced compression of the springs and selectively actuating the valve member through fluid pressure in one spring compartment.

2. In a fluid pressure actuated valve through which fluid is continuously flowing and is actuated by said fluid to selectively divert fluid pressure to an operating mechanism, the combination of a valve housing having spaced internal annular passageways connected respectively with a fluid pressure inlet in the housing, two mechanism outlets in said housing at opposite sides of the inlet and two exhaust outlets in the housing at opposite sides of said mechanism outlets, a sleeve member within said housing having ports therein registering with each of the housing passageways, a slidable valve member within said sleeve having axially spaced annular exterior passageways normally connecting the housing inlet passageway with the housing exhaust outlet passageways through the sleeve ports for a slow bleed of fluid through the passageways and movable to selectively close one exhaust passageway, spaced interior chambers in said valve member, ports in said valve member connecting each interior chamber with the adjacent valve member annular passageway at opposite sides of the housing inlet passageway and maintaining the chambers filled with the bleeding fluid, compression springs in said chambers, an operating member extending through said housing, the valve member chambers and the springs therein, closure members secured to the operating member maintaining normally balanced and opposing pressures on said springs and slidably movable within the valve member chambers for selectively imposing additional pressure on one of said springs, a flange on each closure member overlapping the adjacent end of the valve member in spaced relation thereto for limited movement relative to the valve member in initiating selective fluid pressure actuation of the valve member by compression of one of said springs within the valve member.

3. In a valve for control of flow of fluid pressure therethrough to mechanisms to be controlled thereby in combination, a hollow housing having an inlet opening, two outlet openings and an exhaust opening, a central internal annular fluid pressure passageway in said housing registering with the inlet opening in the wall of said housing, annular internal passageways spaced outwardly from opposite sides of the said central passageway and each registering with an outlet opening in said housing, an annular internal passageway in said housing spaced axially outward from each said passageway registering with the housing outlet openings and each connecting with a single housing exhaust outlet, an annular hollow sleeve member mounted in said housing extending across the said annular passageways in engagement therewith, spaced ports extending through the wall of said sleeve and registering with said housing internal annular passageways, a member slidably mounted within said sleeve in engagement therewith for axial movement relative thereto, a pair of spaced external annular passageways disposed at each side of the mid-portion of said member and connected by a transverse passageway, said latter pairs of passageways being separated by an annular rib on said member which is disposed over said sleeve port registering with the annular passageway of the housing connecting with the housing inlet opening, said rib being smaller than said port opening so that said port opens into the member passageways at opposite sides of the rib, each said pairs of connected slidable member passageways connecting said latter sleeve port with the sleeve port connected with the housing exhaust passageway and normally closing the adjacent sleeve port connecting with the housing outlet passageway, a chamber extending inwardly from each end of said member with the inner ends of the chambers disposed in spaced relation, an operating member extending axially through the valve housing and sliding member for movement relative thereto, an abutment member fixedly mounted on the operating member adjacent each end of the sliding member, each said abutment member having a flange portion overlapping the adjacent end of the sliding member in spaced relation thereto and a portion slidably received within the adjacent chamber, matched compression springs disposed within said chambers between the inner wall of the chamber and the adjacent end of the abutment member normally maintaining said sliding member in balanced spaced relation to the abutment member flanges, whereby movement of the operating member in opposite directions in displacing the sliding member relative to said sleeve member ports causes an imbalance between said springs which in returning to balanced relation further advances the sliding member in the direction of initial movement.

4. The valve as defined in claim 3, wherein said pairs of sliding member passageways are disposed beneath the spring chambers and ports in said sliding member connect each passageway with the adjacent spring chamber for flow of fluid pressure therethrough providing balanced fluid pressures therein when the sliding member is in position providing flow of fluid pressure through the housing exhaust outlet.

5. The valve as defined in claim 3, wherein the mounting of each abutment members on the operating rod is adjustable whereby amount of movement of the sliding member as the springs return to balanced condition is controlled.

6. The valve as defined in claim 3, wherein axially opposite ends of the housing are closed by flexible diaphragms through which the valve operating member extends and against which the abutment members are maintained in fixed relation to the operating member.

References Cited in the file of this patent

UNITED STATES PATENTS

| | | |
|---|---|---|
| 2,214,394 | Wood | Sept. 10, 1940 |
| 2,290,832 | Flygare | July 21, 1942 |
| 2,404,349 | Brant | July 23, 1946 |
| 2,608,263 | Garrison | Aug. 26, 1952 |
| 2,619,121 | Renick | Nov. 25, 1952 |
| 2,624,319 | Heyer | Jan. 6, 1953 |
| 2,644,428 | Ford | July 7, 1953 |